(12) United States Patent
Burkes et al.

(10) Patent No.: US 8,593,654 B2
(45) Date of Patent: Nov. 26, 2013

(54) SETTING A PARTITION SIZE FOR A PRINT JOB

(75) Inventors: Theresa A. Burkes, Boise, ID (US); Shaun Henry, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1181 days.

(21) Appl. No.: 11/866,628

(22) Filed: Oct. 3, 2007

(65) Prior Publication Data

US 2009/0091774 A1   Apr. 9, 2009

(51) Int. Cl.
*G06K 15/00* (2006.01)
(52) U.S. Cl.
USPC .......... 358/1.13; 358/1.9; 358/1.16; 718/101; 718/104

(58) Field of Classification Search
None
See application file for complete search history.

(56) References Cited

U.S. PATENT DOCUMENTS

| | | | |
|---|---|---|---|
| 5,159,681 A | 10/1992 | Beck et al. | |
| 5,287,194 A * | 2/1994 | Lobiondo | 358/296 |
| 5,479,587 A | 12/1995 | Campbell et al. | |
| 5,522,017 A | 5/1996 | Ueda | |
| 5,594,860 A | 1/1997 | Gauthier | |
| 5,615,314 A * | 3/1997 | Schoenzeit et al. | 358/1.15 |
| 5,819,014 A | 10/1998 | Cyr et al. | |
| 5,825,993 A | 10/1998 | Shimura et al. | |
| 5,918,226 A * | 6/1999 | Tarumi et al. | 1/1 |
| 6,040,917 A | 3/2000 | Campbell et al. | |
| 6,311,175 B1 * | 10/2001 | Adriaans et al. | 706/25 |
| 6,327,050 B1 * | 12/2001 | Motamed et al. | 358/1.18 |
| 6,501,567 B2 | 12/2002 | Sharma et al. | |
| 6,574,007 B1 | 6/2003 | Imamura | |
| 6,580,426 B1 | 6/2003 | Small et al. | |
| 6,816,276 B2 | 11/2004 | Sugano | |
| 6,970,261 B1 * | 11/2005 | Robles | 358/1.15 |
| 7,161,705 B2 | 1/2007 | Klassen | |
| 7,202,964 B2 | 4/2007 | Christiansen | |
| 7,394,558 B2 * | 7/2008 | Stringham | 358/1.15 |
| 7,576,878 B2 * | 8/2009 | Christiansen et al. | 358/1.15 |
| 2004/0114170 A1 * | 6/2004 | Christiansen et al. | 358/1.13 |
| 2004/0145768 A1 * | 7/2004 | Stringham | 358/1.14 |

(Continued)

FOREIGN PATENT DOCUMENTS

EP   1 465 054 A2   10/2004
JP   58-175188   10/1983

OTHER PUBLICATIONS

Patent Cooperation Treaty, PCT International Search Report, Mar. 31, 2009, 3 pages, Korea.
Extended European Search Report, European Application No. 08835810.6, Jul. 23, 2012, pp. 1-7.

*Primary Examiner* — Steven Kau
*Assistant Examiner* — Ashish K Thomas

(57) ABSTRACT

A method for print job partitioning in a printing environment having a plurality of RIP (raster image processing) engines includes setting a partition size for a selected print job as a function of one or more of a time sensitive nature of the selected print job and an activity duration measured for the printing environment. A different one of the plurality of RIP (raster image processing) engines is assigned to rasterize each job partition of the set size for the selected print job. The partitions of the selected print job rasterized by the plurality of RIP engines are aggregated into an output file for printing.

21 Claims, 11 Drawing Sheets

(56) References Cited

U.S. PATENT DOCUMENTS

| | | |
|---|---|---|
| 2004/0179218 A1 | 9/2004 | Wissenbach |
| 2004/0184061 A1 | 9/2004 | Christiansen |
| 2004/0196495 A1 * | 10/2004 | Christiansen ............... 358/1.15 |
| 2004/0246502 A1 | 12/2004 | Jacobsen et al. |
| 2006/0055970 A1 * | 3/2006 | Smith et al. ............... 358/1.16 |
| 2006/0206887 A1 | 9/2006 | Dodge et al. |

* cited by examiner

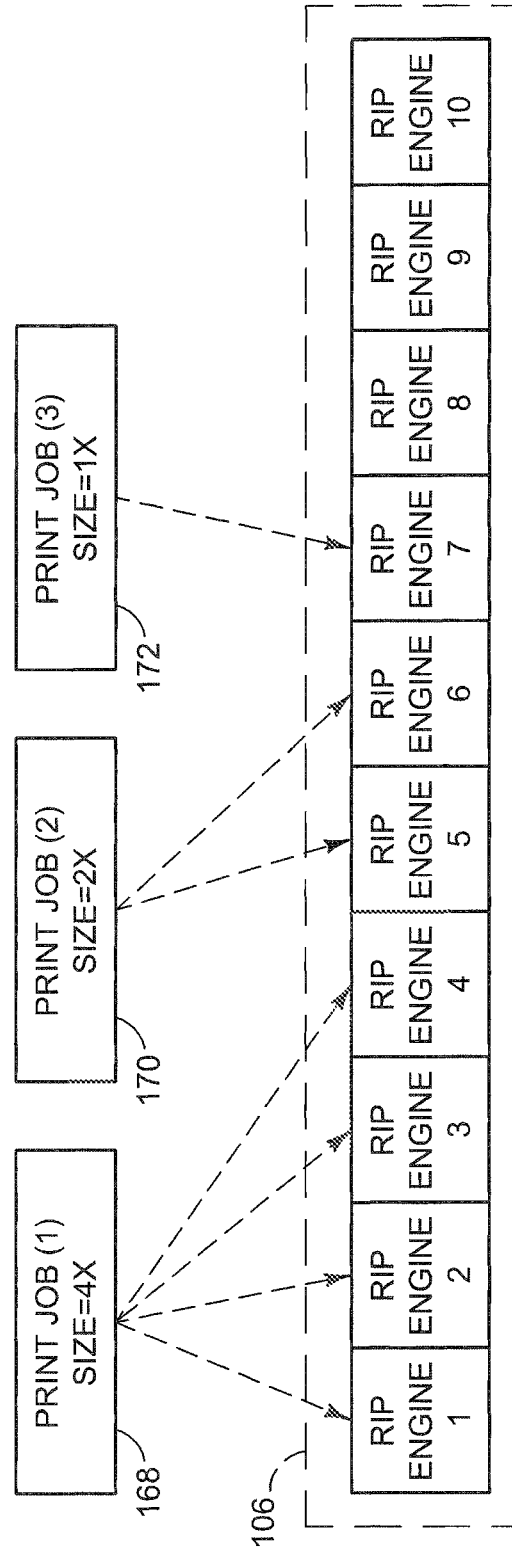

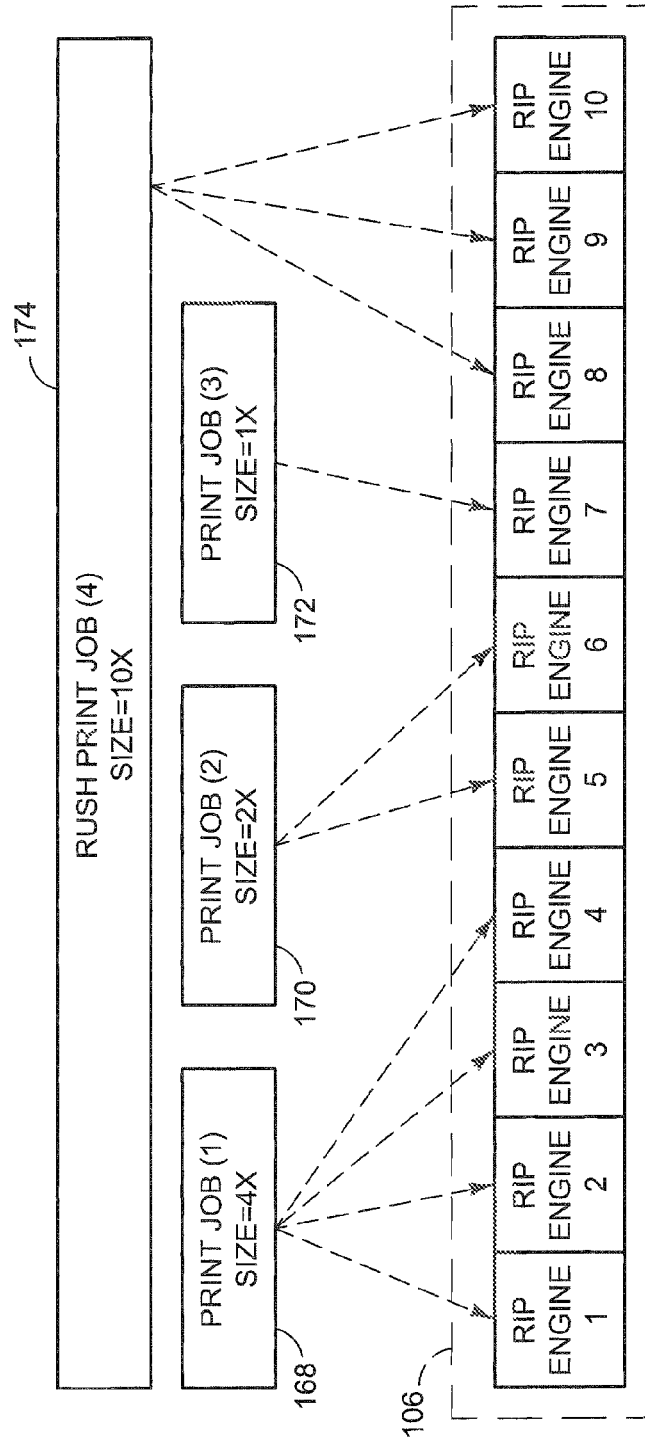

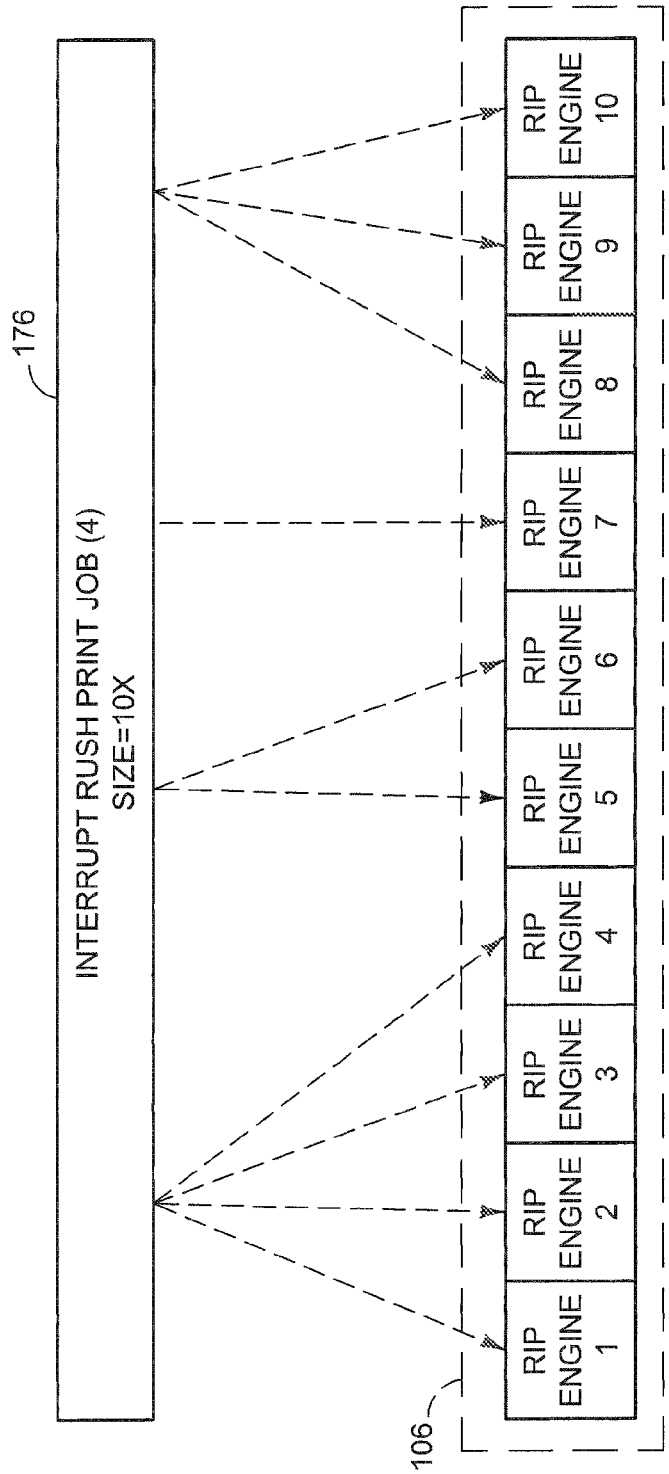

SETTING A PARTITION SIZE FOR A PRINT JOB

BACKGROUND

A print job may be embodied in one of a number of page description languages. Before printing occurs, each page of the print job is rasterized forming one or more bitmap images. This process is called raster image processing and is performed by a RIP (Raster Image Processing) engine. For larger print jobs, a RIP engine can take a relatively long time to perform the needed raster image processing before printing starts.

DRAWINGS

FIGS. 7-14 illustrate exemplary scenarios in which steps from FIG. 6 are implemented.

DETAILED DESCRIPTION

Figure 1:
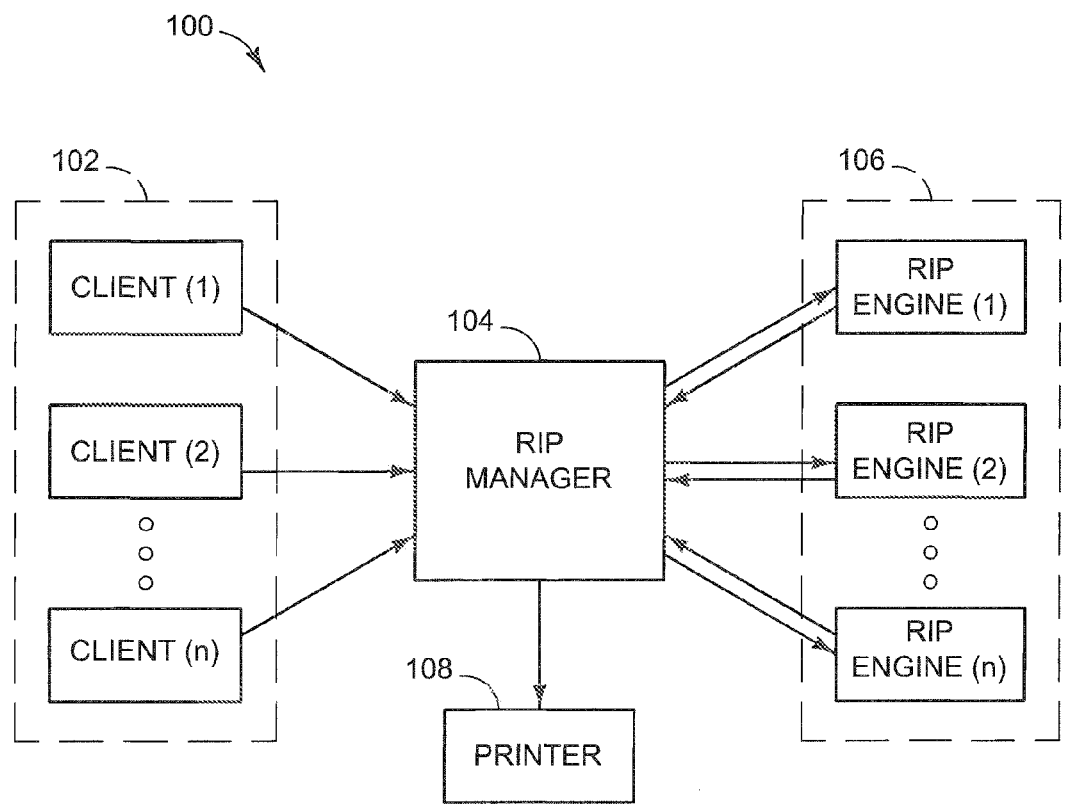
FIGS. 1-3 illustrate exemplary environments in which various embodiments may be implemented.

Environment:

FIG. 1 is an exemplary view of a raster image processing (RIP) environment 100 that includes clients 102, RIP manager 104, RIP engines 106, and printer 108. Clients 102 represent generally any combination of hardware and programming capable of generating and communicating a print job to RIP manager 104. RIP manager represents generally any combination of hardware and programming capable of partitioning print jobs. A partition is generally defined as a subset of the total number of pages of a print job. That subset of pages may or may not be consecutive. For each partition, RIP manager 104 is also responsible for assigning one of RIP engines 106 to rasterize that partition. RIP engines 106 each represent any combination of hardware and programming capable of rasterizing an assigned partition. It is noted that a print job partition may be the entire print job in certain circumstances discussed below. RIP manager 104 aggregates the rasterized partitions of a print job to form an output file and communicates the output file to printer 108.

In operation clients 102 communicate print jobs to RIP manager 104. RIP manager 104 segregates each print job into partitions and creates a partition specification in a database or other data structure that is employed to track a status of each partition for that print job. RIP manager 104 then assigns each partition to one of RIP engines 106. Each assigned RIP engine 106 accesses the print job and rasterizes its assigned partition. Once finished, each assigned RIP engine 106 communicates its rasterized partition to RIP manager 104. Depending upon the size of the print job, the number of partitions, and the number of RIP engines 106, one or more partitions may be assigned to any given RIP engine 106.

It is noted that each RIP engine 106 may be implemented using a different computing device. Alternatively, two or more RIP engines 106 can be implemented using a single computing device. For example, computing device may be programmed with an application for rasterizing print jobs and print job partitions. That computing device may also be able to execute multiple instances of that application. In this example, each instance could be considered a RIP engine. While not shown, environment 100 may include more than one printer 108, more than one RIP manager 104, any number of RIP engines 106, and any number of clients 102.

Once all of the partitions of a print job have been rasterized, RIP manager 104 combines or aggregates the rasterized partitions into a single output file. RIP manager 104 communicates the output file to printer 108. Printer 108 may be any appropriate printer taking into account the size of the print job and the printing capacity of printer 108. In this manner, RIP engines 106 work in parallel to rasterize a print job. Depending upon the size of the job, this can greatly decrease the time taken for rasterizing a print job allowing printer 108 to more quickly complete printing of the job. Partitioning of each job, however, incurs overhead, thereby decreasing overall printing throughput (pages per minute) in a busy system. This overhead includes the time needed to partition the print job, communicate the print job to each RIP engine 106, and the time spent aggregating rasterized partitions. Further, when all RIP engines 106 are being utilized for a single print job, only one print job can be processed at a time.

Restated, the rasterizing time for a given print job can be reduced by minimizing the partition size for that print job. In this manner, the print job can be separated into multiple partitions so that all RIP engines 106 can be used to rasterize partitions in parallel. The overall rasterization time for the print job is minimized allowing printer 108 to complete printing of the job sooner. However, as time passes, more and more print jobs await processing, and the throughput of printing environment 100 can be maximized when a maximum partition size is set. Ultimately, this can mean that each print job is rasterized by a single RIP engine 106. In this manner, multiple print jobs are rasterized in parallel. For a typical printing business, maximizing throughput takes priority. Exceptions occur when a particular print job is time sensitive, and turnaround time for that job is to be minimized. Furthermore, when printing environment 100 has been otherwise idle, it can prove beneficial to finish the first jobs more quickly by minimizing the rasterizing time for a print job.

Various embodiments described below operate to selectively control partitioning based on factors that include a duration for which a printing environment has been active and whether or not a given print job is time sensitive. For example, if printer 108 is idle or if a print job is a rush job, a minimum partition size may be selected maximizing the utilization of all available RIP engines 106 for the one print job. As time goes on, the printing environment becomes more and more active. As a consequence, the partition size for each print job is increased until no partitioning is needed, that is, until each print job is sent to its own RIP engine 106.

Figure 2:
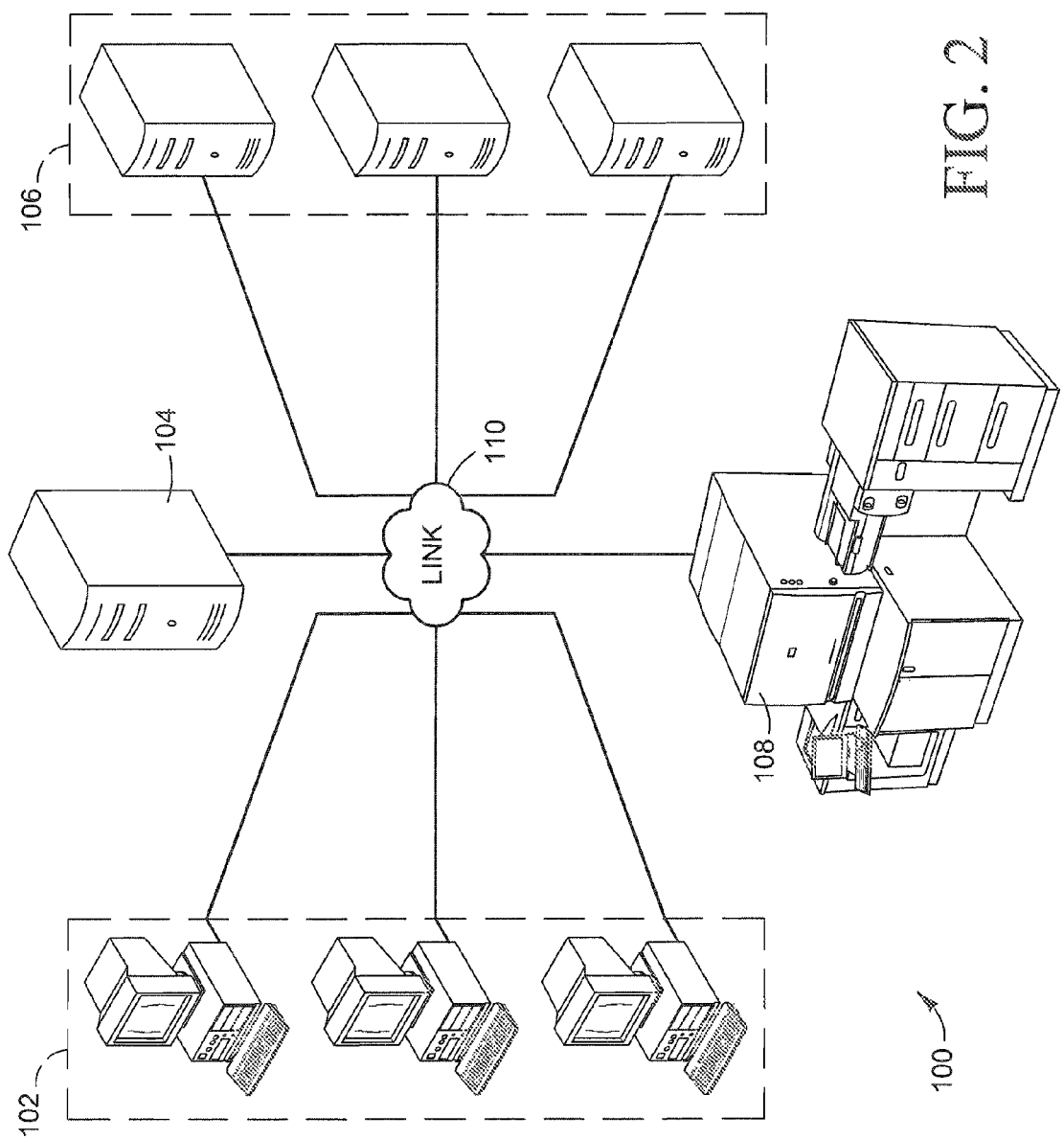
Figure 3:
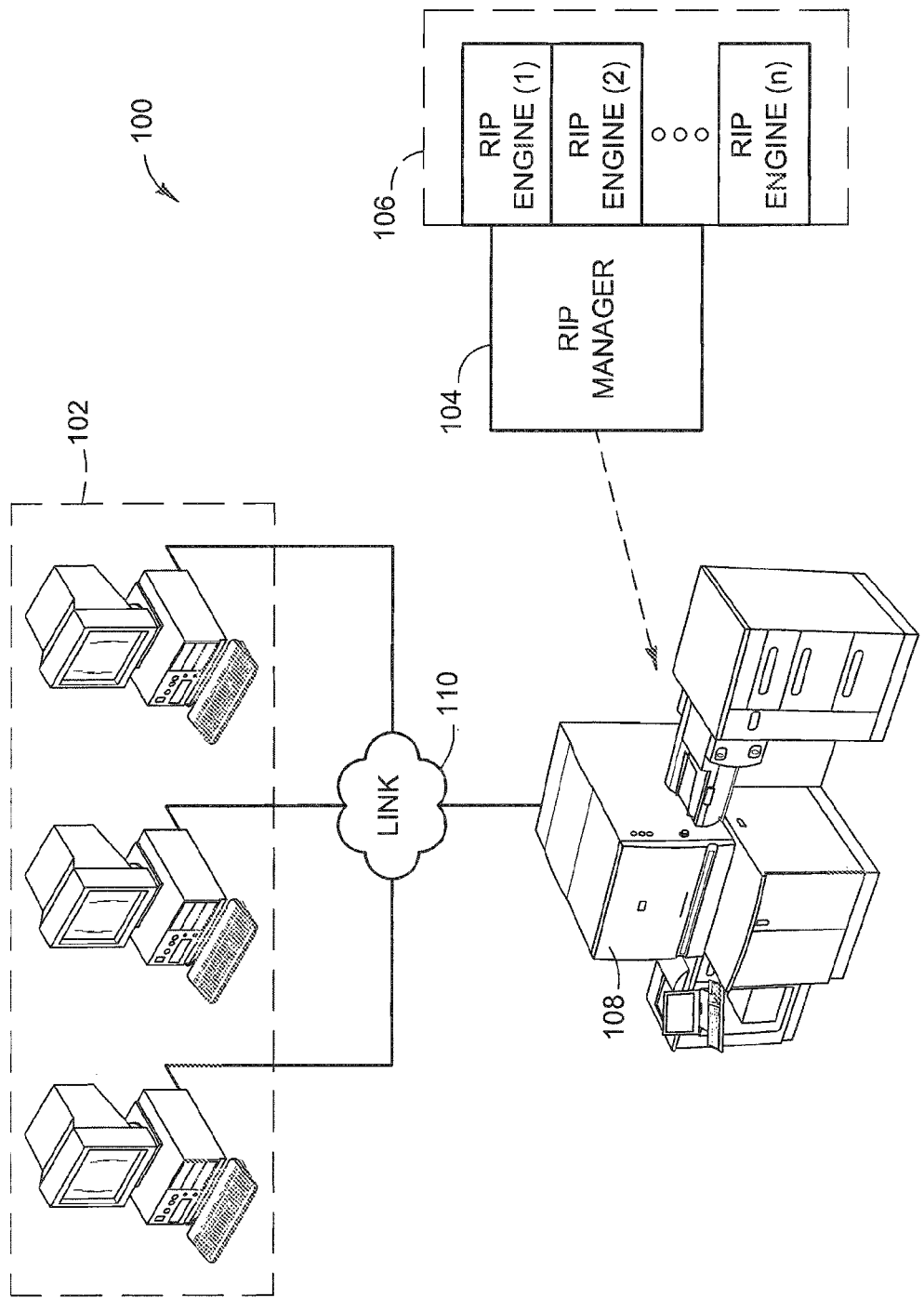

FIGS. 2 and 3 illustrate exemplary implementations of RIP environment 100. In FIG. 2, RIP environment 100 clients 102 are in the form of computers. RIP manager 104 is implemented using a server computer and RIP engines 106 are implemented using multiple server computers. Printer 108 is shown as a digital press. Link 110 interconnects clients 102, RIP manager, 104, RIP engines 106, and printer 108. Link 110 represents generally a cable, wireless, or remote connection via a telecommunication link, an infrared link, a radio frequency link, or any other connector or system of connectors that provides electronic communication between clients 102, RIP manager 104, RIP engines 106, and printer 108. Link 110 may include an intranet, the Internet, or a combination of both. Each portion of link 110 connecting a given component 102, 104, 106, or 108 may or may not be distinct from the remaining portions of link 110. For example printer 108 may be connected to RIP manager 104 via a direct cable connection.

In FIG. 3, RIP manager 104 and RIP engines 106 are integrated in printer 108. Other variations are also possible. For example, RIP manager 104 and one or more RIP engines may be implemented using one server computer while other RIP Engines are implemented using one or more other server computers and printer 108.

Figure 4:
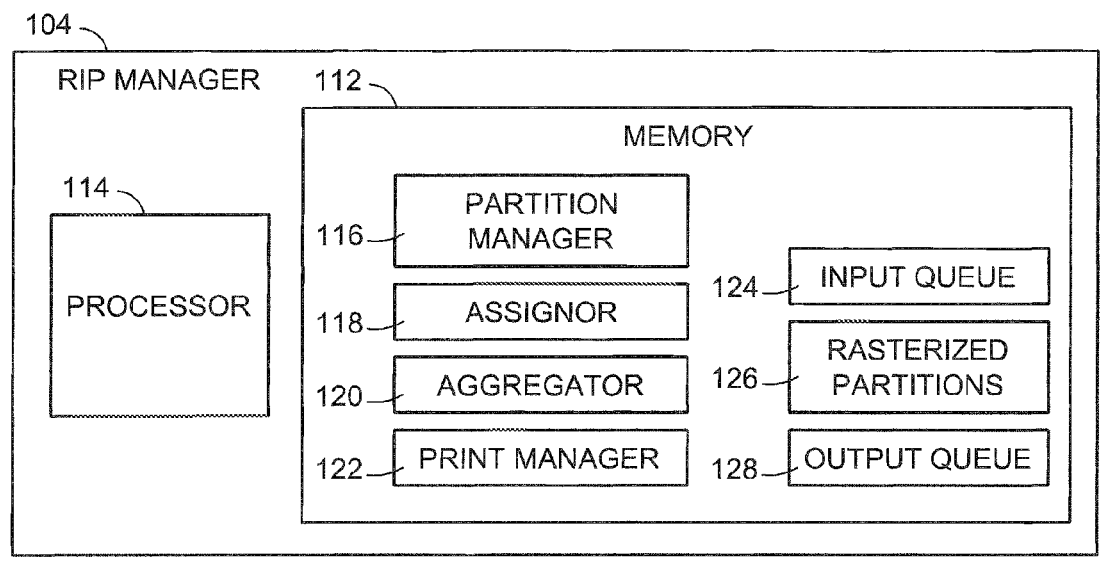
FIGS. 4 and 5 are exemplary block diagrams illustrating physical and logical components of various embodiments.

Components:

FIG. 4 is a block diagram illustrating physical and logical components of RIP manager 104. In this example, RIP manager 104 includes memory 112 and processor 108. While shown as a single block, memory 112 may include one or more disparate memory types. For example, memory 112 may include any combination of random access memory, read only memory, hard disk drives, flash memory, and the like. Processor 114 represents generally any processor capable of executing program instructions stored in memory 112.

Memory 112 is shown to include partition manager 116, assignor 118, aggregator 120, and print manager 122. Memory 112 is also shown to include input queue 124, partition queue 126, and output queue 128. Input queue 124 represents generally any queue for staging incoming print jobs that have yet to be rasterized. Partition queue 126 represents generally any queue for staging print job partitions that have been rasterized but not yet aggregated into a output file to send to printer 108. Output queue 128 represents generally any queue for staging output files to be sent to printer 108

Partition manager 116 represents generally any program instructions configured to be executed to select a print job from input queue 124 and to set a partition size for that print job. The partition size may be set as a function of how long a printing environment has been active as well as the time sensitive nature of a print job. Where input queue 124 is guided by a first in first out policy, partition manager 116 may select a next print job from input queue 124—meaning the print job that has been held in input queue 124 the longest. A print job in input queue 124 may be time sensitive. Partition manager 116 may then select such time sensitive print jobs out of order so that they can be processed sooner.

Partition manager 116 is configured to measure or otherwise identify an activity duration. The activity duration is measured from a last known time at which the printing environment was idle. In other words, the activity duration is a measure of how long the printing environment has been active. Partition manager 116 can set the partition size as a function of a measured activity duration. Partition manager 116 can then set the partition size according to an increasing function such that the partition size set increases as the measured activity duration increases. The increasing function may be linear or non linear. It may be configured or adjusted based on prior use of the printing environment.

When setting partition sizes, partition manager 116 observes a minimum size. The minimum size is a size beneath which a partition size will not be set. In some scenarios, the minimum size would otherwise exceed the size of a print a print job. For such a print job, the minimum size is set to the print job size. The minimum size may have a fixed maximum value that can be reduced based on the size of a print job. For example, a minimum size may have a fixed maximum value of five pages, and a given print job may only have three pages. In such a case, the minimum size for that three page print job is set to three pages.

Where a measured activity duration reveals that the printing system is otherwise idle, partition manager 116 can set the partition size to the minimum size. The minimum size may result in the selected print job being separated into a number of partitions that is less than or equal to the number of RIP engines 106. For example, assume there are ten RIP engines 106 and the selected print job is fifty pages. Assuming the minimum size is five pages, the print job could be separated into ten, five page partitions, so that all ten RIP engines 106 are used. However, the minimum size may be greater than five pages. In such a case, partition manager 116 would separate the print job into fewer than ten partitions, so that only a portion of the RIP engines 106 would be used. In some implementations it may prove beneficial to separate a print job creating more partitions than RIP engines 106. Continuing with the above example, the minimum size may be less than five pages. In this case, partition manager 116 would separate the print job into more than ten partitions of that smaller size. In this fashion, one or more of the RIP engines would be assigned to rasterize two or more partitions of the print job.

Partition manager 116 also observes a threshold duration and a maximum size. A threshold duration is a duration of printing environment activity after which partition manager 116 sets the partition size to the maximum size. For example, a threshold duration may be set at twenty minutes. Once partition manager 116 determines that the printing environment has been active for twenty minutes—that is, the measured activity duration has reached twenty minutes—partition manager 116 sets the partition size to the maximum size. In some cases a selected print job may be smaller than the maximum size. For example, if the maximum size is twenty-five pages and the print job has only twenty pages, the maximum size would be set at twenty pages for that print job. If the print job had more than twenty five pages, the maximum size would remain at twenty-five pages.

In many instances, a printing environment will be active, and partition manager 116 will measure an activity duration that is less than the threshold duration. In such cases, partition manager 116 sets the partition size for the print job to an intermediate size. Assuming the print job is larger than the minimum size, the intermediate size is a partition size greater than the minimum partition size. Assume, for example, that a print job has twenty pages and the minimum size is set at five pages. In such a scenario, the intermediate partition size would be greater than five pages. If the print job had five or fewer pages, the intermediate partition size would be equal to the size of the print job. The intermediate size is also less than the maximum size.

Assuming the print job is of sufficient size, the intermediate size varies between the minimum size and the maximum size based upon the particular increasing function utilized by partition manager 116. In other words, when the measured activity duration falls between zero and the threshold duration, partition manager 116 will set a partition size for the print job that is greater than the partition size that would have been set if the measured activity duration were less. Likewise, partition manager will set a partition size for the print job that is smaller than a partition size that would have been set if the activity duration were greater.

As noted above, partition manager 116 can also set partition sizes as a function of the time sensitivity of the selected print job. Where a selected print job is identified as time sensitive, the print job may have a production deadline meaning that the print job is to be printed by a certain time. In such a case, partition manager 116 sets the partition size so that enough RIP engines 106 are assigned to rasterize partitions of the selected print job to complete rasterization of the selected print job to meet the production deadline.

Where a selected print job is identified as time sensitive, the print job may be a rush job meaning that it is to be completed as soon as possible. In such a case, partition manager 116 sets the partition size so that the selected print job is separated into a number of partitions equal to the number of rip engines 106. In this manner, each RIP engine 106 can be assigned to rasterize a different partition and the rasterization of the selected print job can be completed more quickly. In cases where one or more RIP engines 106 are busy, such RIP engines 106 are assigned to rasterize their portions of the selected print job as they become available. Alternatively, the selected print job may be a rush job with an interrupt request. In such a case, any busy RIP engines 106 are interrupted so they can be assigned to rasterize their portions of the selected print job sooner.

Assignor 118 represents generally any program instructions configured to be executed to assign selected RIP engines 106 to rasterize selected print job partitions of sizes set by partition manager 116. Aggregator 120 represents generally any program instructions configured to be executed to collect and aggregate rasterized portions of a print job to form an output file to be sent to printer 108. For example, rasterized partitions of print jobs may be collected in partition queue 126. Aggregator 120 accesses partition queue 126 and combines rasterized partitions for each particular print job being processed. Each rasterized partition may, for example, have associated data identifying the particular print job of which it is a part and its position within that print job. Aggregator 120 can use this data to combine 120 rasterized partitions in a desired order to an output file placed in output queue 128.

Print manager 122 represents generally any program instructions configured to be executed to communicate output files from output queue 128. Where output queue 128 is guided by a first in first out policy, print manager 122 may select a next output file from output queue 128—meaning the output file that has been held in output queue 128 the longest. An output file may be generated from a time sensitive print job. Print manager 122 may then select such time sensitive output file out of order so that it can be printed sooner.

Figure 5:
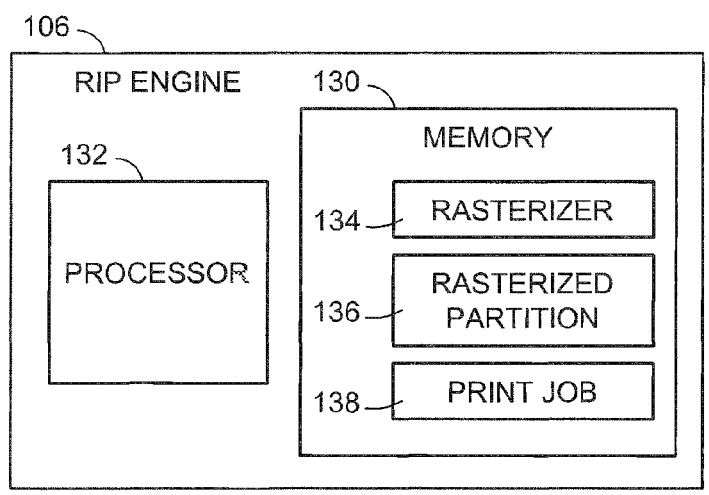

FIG. 5 is a block diagram illustrating physical and logical components of a RIP engine 106. In this example, RIP engine 106 includes memory 130 and processor 132. While shown as a single block, memory 130 may include one or more disparate memory types. For example, memory 106 may include any combination of random access memory, read only memory, hard disk drives, flash memory, and the like. Processor 132 represents generally any processor capable of executing program instructions stored in memory 130.

Memory 130 is shown to include rasterizer 134, rasterized partition 136, and print job 138. Print job 138 represents the print job containing the partition currently being rasterized by RIP engine 106. This may include the entire print job or a selected portion corresponding to the particular partition to be rasterized. Rasterizer 134 represents generally any program instructions configured to be executed to acquire print job 138 from RIP manager 104 and to rasterized a partition as assigned by RIP manager 104. Rasterizer 134 may be configured such that multiple instances can be executed concurrently. In such a case, RIP engine 106 may actually represent multiple RIP engines 106—one for each instance of rasterizer 134. Rasterized partition(s) 136 represents one or more partitions having been or currently being rasterized by rasterizer 134 or multiple instances of rasterizer 134. Rasterizer 134 is also responsible for communicating rasterized partition(s) 136 to RIP manager 104 so that they can be aggregated into an output file.

Figure 6:
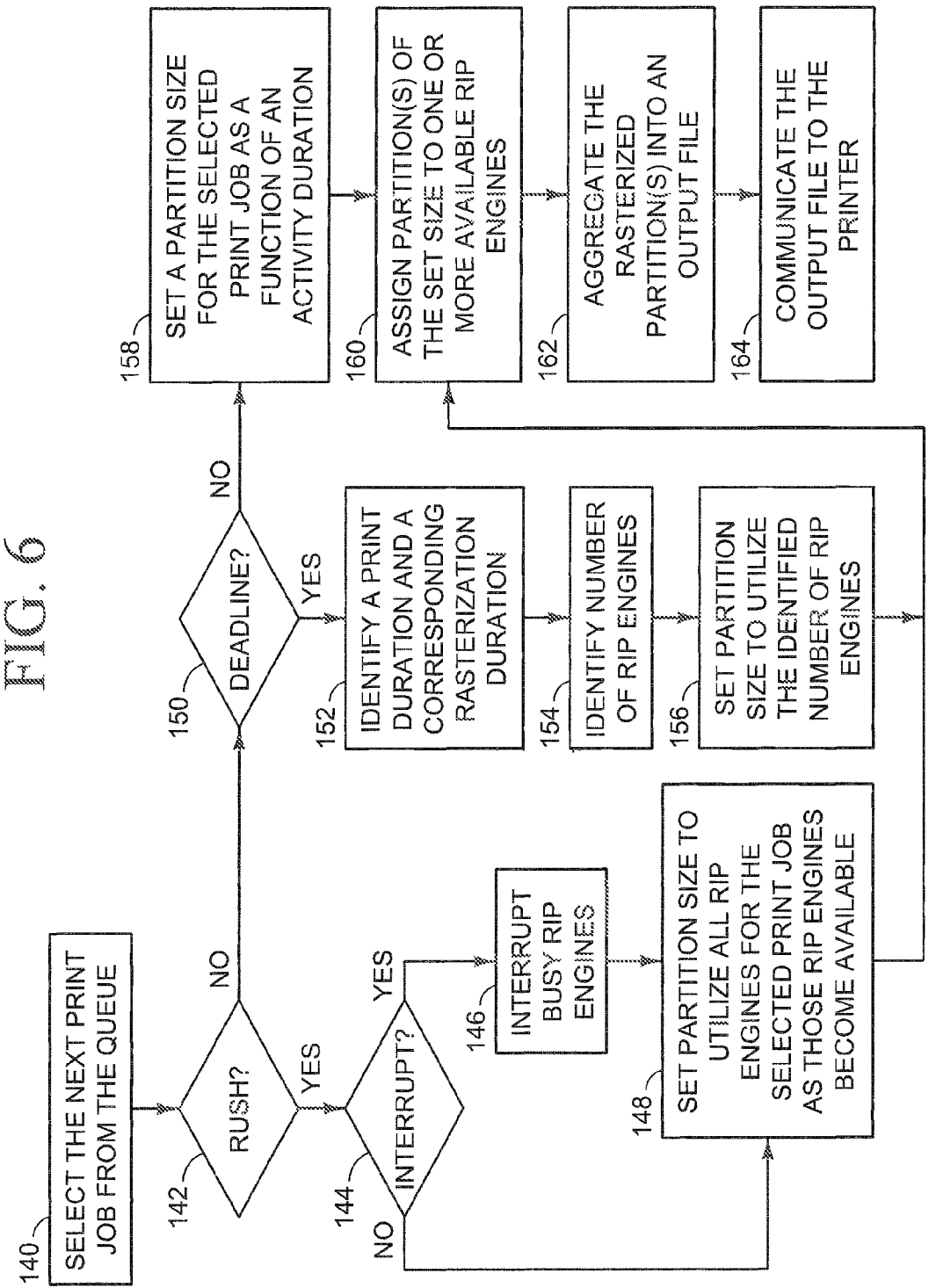
FIG. 6 is an exemplary flow diagram of steps for implementing one or more embodiments.
Figure 15:
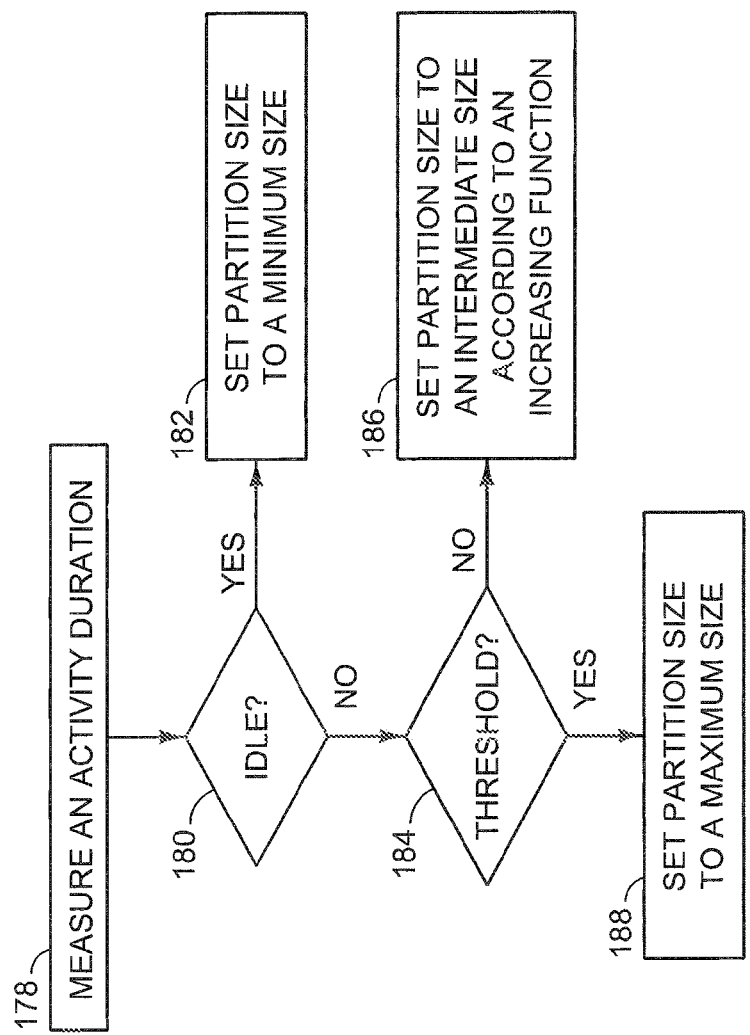
FIG. 15 is an exemplary flow diagram of steps for implementing one or more embodiments.

Operation:

FIG. 6 is an exemplary flow diagram illustrating steps for implementing various embodiments. FIGS. 7-14 illustrate various examples of setting a partition size as a function of the time sensitive nature of a print job. FIG. 15 is an exemplary flow diagram illustrating steps taken when setting a partition size as a function of an activity duration.

Starting with FIG. 6, a next print job is selected from an input queue (step 140). Where the input queue is guided by a first in first out policy, the next print job may be the print job that has been held in the input queue the longest. However, a print job in the input queue may be time sensitive. In such case, the most time sensitive print job is selected as the next print job. The most time sensitive print job, for example, may be the print job having the earliest production deadline. In the case of a conflict among deadlines, the time sensitive print job that has been in the input queue the longest is selected. During operation, step 140 is continually repeated as long as there are print jobs in the queue.

It is next determined whether the selected print job is a time sensitive rush print job (step 142). For such print jobs production, that is printing, is to be completed as soon as possible. From here the process branches. If the print job is a rush print job the process continues with steps 144-148. If not the process continues with step 150. Where it is determined that the print job is a rush print job, it is next determined if there is an interrupt request for the rush print job (step 144). If so, any busy RIP engines are interrupted and the process continues with step 148. If not the process jumps to step 148. The partition size for the selected print job is set to utilize all available RIP engines as those RIP engines become available (step 148). In other words, where there is an interrupt request, all RIP engines are available. Otherwise, busy RIP engines are allowed to finish rasterizing other assignments and then become available to rasterize partitions of the selected print job. From here, the process jumps to step 160, discussed below.

Following step 142, if it is determined that the selected print job is not a rush job, it is determined if the selected print job has a production deadline meaning that the print job is to be printed by a certain time (step 150). It is noted that situations may arise in which a production deadline cannot be met. In such cases, a print job with a production deadline may be treated as a rush print job. From here the process branches. If the print job has a production deadline, the process continues with steps 152-156. If not, the process continues with step 158. If it is determined that the print job has a production deadline, a print duration and a corresponding rasterization duration are identified (step 152). In general, the production time of a print job includes the rasterization time and the print time. Where the print job includes a known number of pages, the print duration, that is, time needed to print those pages can be calculated or estimated based on a known speed of a printer. If rasterization does not overlap printing, subtracting the print duration from the time available to meet the production deadline reveals the corresponding rasterization duration. For example, where the time available to meet a deadline is one hour and the print duration is calculated or estimated to be twenty minutes, the corresponding rasterization duration would be the forty minutes preceding the printing duration. In implementations where rasterization overlaps printing, the rasterization duration includes the rasterization time required to start printing plus the print time minus the time to finish the last rasterized pages.

The number of available RIP engines is then identified (step 154). This number represents the number of RIP engines that can concurrently rasterize partitions of the selected print job so that the entire print job is rasterized within the corresponding rasterization duration. In the example above where the size of the print job is known and where the corresponding rasterization duration is forty minutes. The speed at which a RIP engine can rasterize a partition of a particular size is known or can be estimated. Base on this, a size of a partition that can be rasterized within the corresponding rasterization duration is determined. From this partition size and the size of the selected print job, the total number of partitions or the number of RIP engines can be identified. For example, where a print job has one thousand pages and it is determined that each given RIP engine can rasterize one hundred pages within the corresponding rasterization duration, then ten RIP engines working concurrently could rasterize the entire print job within the corresponding rasterization duration. In this example, the number of RIP engines identified in step 154 would be ten. The partition size for the selected print job is then set to utilize the identified number of RIP engines (step 156). In the example above, the partition size would be set at one hundred pages so that the print job will be separated into ten partitions. From here the process jumps to step 160, discussed below.

Following step 150, if it is determined that the selected print job does not have a production deadline, the partition size is set as a function of an activity duration (step 158). As described above an activity duration is a duration for which a printing environment has been active in processing print jobs. An example of step 158 is discussed in more detail below with respect to FIG. 15. However, the goal of step 158 is to increase the partition sizes set for print jobs as the activity duration increases. In this fashion, an initial print job is separated into a maximum number of partitions. Subsequent print jobs are separated into partitions of increasing size—each partition size being a function of an activity duration. For larger print jobs, a maximum partition size may be set.

RIP engines are assigned to rasterize selected partitions of the size set in step 148, 156, or 158 (step 160). As the partitions are rasterized or once all partitions of the selected print job are rasterized, the rasterized partitions are aggregated to form an output file (step 162). An output file is in a rasterized format that can be processed and printed by a selected printer. The output file is communicated to the selected printer (step 164).

FIGS. 7-12 help illustrate an example in which a selected print job is a rush print job. FIG. 7 is a block diagram of an input queue 166 containing print jobs 168, 170, and 172. In this example print job 168 has a size of 4×, print job 170 has a size of 2× and print job 172 has a size of 1×. FIG. 8 illustrates a system with ten RIP engines 106, all of which are available, that is, not being used. Print job 168 has been separated into four partitions of size X being rasterized by four RIP engines 106. Print job 170 has been separated into two partitions of size X being rasterized by two RIP engines 106. Finally, print job 172 has only one partition of size X being rasterized by a single RIP engine 7.

FIG. 9 shows that a rush print job 174 has been added to queue 166. In this example, the rush print job 174 does not include an interrupt request. Moving to FIG. 10, rush print job 174 has a size of 10×. In this example, there are ten RIP engines 106. The partition size rush print job 174 is set to size X so that each of RIP engines 106 can be assigned to rasterize a different partition of rush print job 174. In FIG. 10, the three available RIP engines 106 are assigned to rasterize three of the ten partitions of rush print job 174.

Figure 11:
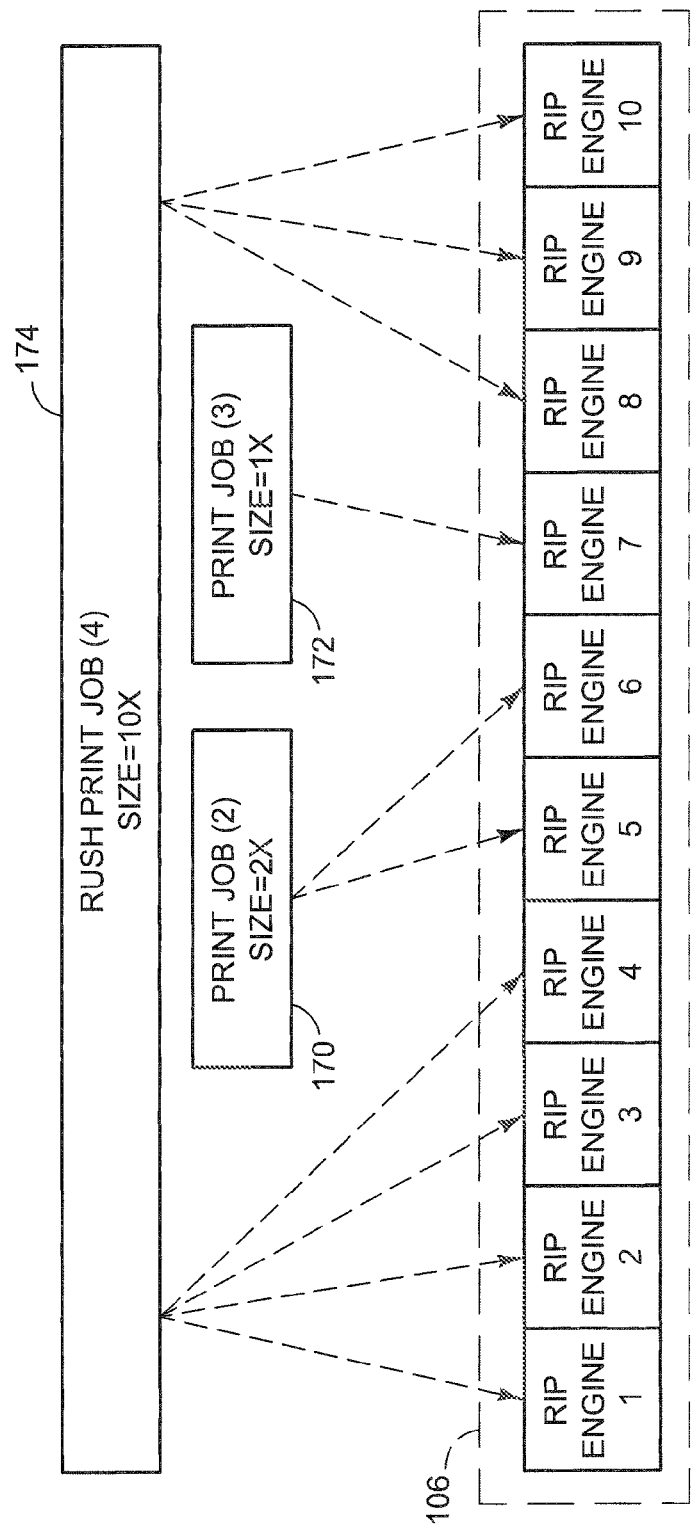
Figure 12:
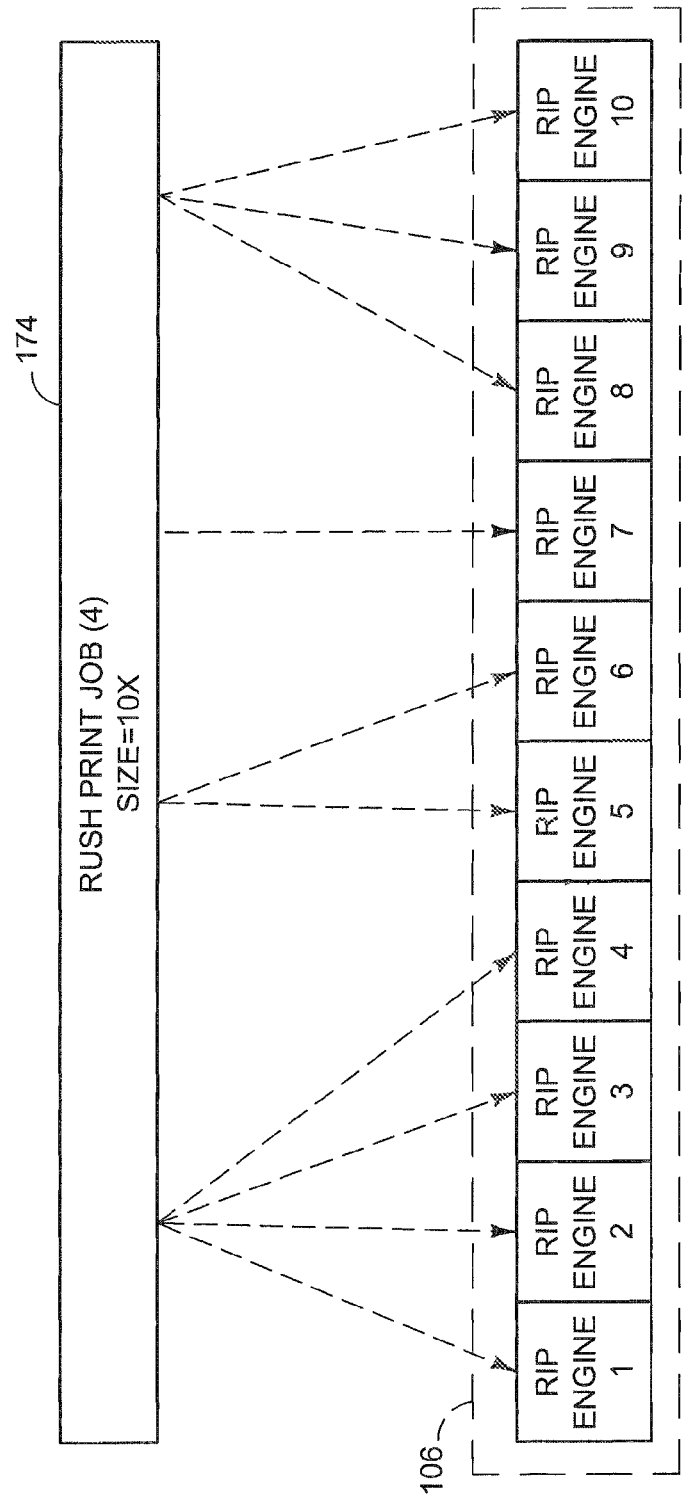

The remaining seven busy RIP engines 106 are reserved and assigned to rasterize the remaining seven partitions of rush print job 174 as those RIP engines 106 become available. In this manner, RIP engines 106 will not rasterize other print jobs until they have processed rush print job 174. In FIG. 11, the four RIP engines that were rasterizing print job 168 have become available and have been assigned to rasterize four other partitions of rush print job 174. In FIG. 12, the three RIP engines that were rasterizing print jobs 170 and 172 have become available and have been assigned to rasterize the remaining three partitions of rush print job 174.

Moving to FIG. 13, instead of adding rush print job 174 to queue 166, interrupt rush print job 176 has been added. Print job 176 is a rush print job that includes an interrupt request. Viewing FIG. 14, print jobs 168, 170, and 172 were being rasterized by RIP engines 106. However, the RIP engines 106 that were busy rasterizing those print jobs have been interrupted and the rasterization of those print jobs has been paused availing all RIP engines 106 for rasterizing interrupt rush print job 176.

FIG. 15 is an exemplary flow diagram expanding on setting a partition size in step 158 of FIG. 6. An activity duration is measured (step 178). The activity duration represents a period of time for which a printing environment has been active processing print jobs. It is determined if the printing environment is idle (step 180). An idle print environment would have an activity duration of zero or some other value representing inactivity. If idle, the partition size is set to a minimum size (step 182). If not idle, it is determined if the measured activity duration has met or exceeded a threshold duration (step 184). If the measured activity duration has not met or exceeded the threshold duration, the partition size is set to an intermediate partition size according to an increasing function (step 186). If the threshold duration has been met or exceeded, the partition size is set to a maximum size (step 188).

CONCLUSION

The printing environments 100 shown in FIGS. 1-3 are exemplary printing environments in which embodiments of the present invention may be implemented. Implementation, however, is not limited to these printing environments. Embodiments can be implemented in any printing environment in which it is desirable to partition print jobs. The diagrams of FIGS. 4 and 5 show the architecture, functionality, and operation of various embodiments. Various components illustrated in FIGS. 4 and 5 are defined at least in part as programs. Each such component or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 6 and 15 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for print job partitioning in a printing environment having a plurality of RIP (raster image processing) engines, comprising:
    setting a partition size for a selected print job as a function of a time sensitive nature of the selected print job and an activity duration measured from a last known time at which the printing environment was idle for the printing environment;
    assigning a different one of the plurality of RIP engines to rasterize each job partition of the set size for the selected print job; and
    aggregating each partition of the selected print job rasterized by the plurality of RIP engines into an output file for printing;
    in which setting the partition size as a function of an activity duration measured from a last known time at which the printing environment was idle comprises setting a partition size according to an increasing function such that the partition size of each print job increases as the measured activity duration increases.

2. The method of claim 1, wherein setting a partition size as a function of a time sensitive nature of the selected print job comprises:
    determining if the selected print job is a rush job; and
    as a result of determining that the selected print job is a rush print job, setting the partition size so that each of the plurality of RIP engines will be assigned to rasterize a partition of the selected print job.

3. The method of claim 1, wherein setting a partition size as a function of a time sensitive nature of the selected print job comprises:
    determining if the selected print job is a rush job with an interrupt request; and
    as a result of determining that the selected print job is a rush print job with an interrupt request, setting the partition size so that each of the plurality of RIP engines will be assigned to rasterize a partition of the selected size and interrupting any busy RIP engine so that it is available to be assigned to rasterize a partition of the selected print job.

4. The method of claim 1, wherein setting a partition size as a function of a time sensitive nature of the selected print job comprises determining if the selected print job has a production deadline, and as a result of determining that the selected print job has a production deadline:
    identifying a print duration for the selected print job;
    identifying a rasterization duration such that the rasterization duration combined with the print duration falls within the production deadline;
    identifying a number of RIP engines that can concurrently rasterize partitions of the selected print jobs within the rasterization duration; and
    setting a partition size so that the resulting number of partitions is at least equal to the determined number of RIP engines.

5. The method of claim 1, wherein setting a partition size according to an increasing function, comprises:
    measuring a duration since the printing system has been idle;
    setting the partition size at a minimum size when the measurement reveals that the printing system is presently idle;
    setting the partition size to an intermediate size greater than the minimum size when the measurement reveals that the printing environment has been active for a duration that is less than a threshold duration; and
    setting the partition size to a maximum size when the measurement reveals that the printing environment has been active for a duration that meets or exceeds the threshold duration.

6. The method of claim 5, wherein setting the partition size to an intermediate size comprises:
    setting the partition size to a size that is greater than a first size that corresponds to a first duration that is less than the measured duration; and
    setting the partition size to a size that is less than a second size that corresponds to a second duration that is greater than the measured duration.

7. A non-transitory computer readable medium having computer executable instructions for:
    setting a partition size for a selected print job as a function of a time sensitive nature of the selected print job and a length of time that has elapsed from a last known time when a printing system was idle;
    assigning a different one of a plurality of RIP (raster image processing) engines of a printing environment to rasterize each job partition of the set size for the selected print job;
    aggregating each partition of the selected print job rasterized by the plurality of RIP engines into an output file; and
    communicating the output file to a printer;
    in which the instructions for setting a partition size as a function of a time sensitive nature of the selected print job comprises instructions for:
        identifying a number of available RIP engines that can concurrently rasterize partitions of the selected print job within a predetermined duration; and
        setting a partition size so that the resulting number of partitions is equal to the identified number of RIP engines.

8. The medium of claim 7, wherein the instructions for setting a partition size as a function of a time sensitive nature of the selected print job includes instructions for:
    determining if the selected print job is a rush job; and
    as a result of determining that the selected print job is a rush print job, setting the partition size so that each of the plurality of RIP engines will be assigned to rasterize a partition of the selected print job.

9. The medium of claim 7, wherein the instructions for setting a partition size as a function of a time sensitive nature of the selected print job includes instructions for:
    determining if the selected print job is a rush job with an interrupt request; and
    as a result of determining that the selected print job is a rush print job with an interrupt request, setting the partition size so that each of the plurality of RIP engines will be assigned to rasterize a partition of the selected size and interrupting any busy RIP engine so that it is available to be assigned to rasterize a partition of the selected print job.

10. The medium of claim 7, wherein the instructions for setting a partition size as a function of a time sensitive nature of the selected print job further includes instructions for determining if the selected print job has a production deadline, and as a result of determining that the selected print job has a production deadline:
identifying a print duration for the selected print job; and
identifying a rasterization duration such that the rasterization duration combined with the print duration falls within the production deadline.

11. The medium of claim 7, wherein the instructions for setting a partition size as a function of an activity duration measured for the printing environment, include instructions for setting a partition size according to an increasing function such that the partition size set increases as the measured activity duration increases.

12. The medium of claim 7, wherein the instructions for setting a partition size according to an increasing function, include instructions for:
measuring a duration since the printing system has been idle;
setting the partition size at a minimum size when the measurement reveals that the printing system is presently idle;
setting the partition size to an intermediate size greater than the minimum size when the measurement reveals that the printing environment has been active for a duration that is less than a threshold duration; and
setting the partition size to a maximum size when the measurement reveals that the printing environment has been active for a duration that meets or exceeds the threshold duration.

13. The medium of claim 12, wherein the instructions for setting the partition size to an intermediate size include instructions for:
setting the partition size to a size that is greater than a first size that corresponds to a first duration that is less than the measured duration; and
setting the partition size to a size that is less than a second size that corresponds to a second duration that is greater than the measured duration.

14. A system for print job partitioning in a printing environment comprising:
a plurality of RIP (raster image processing) engines,
a partition manager operable to set a partition size for a selected print job as a function of a time sensitive nature of the selected print job and an activity duration measured for the printing environment; the activity duration being a length of time that has elapsed from a last known time when the printing environment was idle;
an assignor operable to assign a different one of the plurality of RIP engines to rasterize each job partition of the set size for the selected print job;
an aggregator operable to aggregate partitions of the selected print job rasterized by the plurality of RIP engines into an output file;
and a print manager operable to communicate the output file to a printer; in which setting a partition size as a function of a time sensitive nature of the selected print job comprises: identifying a number of available RIP engines that can concurrently rasterize partitions of the selected print job within a predetermined duration; and setting a partition size so that the resulting number of partitions is equal to the identified number of RIP engines.

15. The system of claim 14, wherein the partition manager is operable to set a partition size as a function of a time sensitive nature of the selected print job by:
determining if the selected print job is a rush job; and
as a result of determining that the selected print job is a rush print job, setting the partition size so that each of the plurality of RIP engines will be assigned to rasterize a partition of the selected print job.

16. The system of claim 14, wherein the partition manager is operable to set a partition size as a function of a time sensitive nature of the selected print job by:
determining if the selected print job is a rush job with an interrupt request; and
as a result of determining that the selected print job is a rush print job with an interrupt request, setting the partition size so that each of the plurality of RIP engines will be assigned to rasterize a partition of the selected size and interrupting any busy RIP engine so that it is available to be assigned to rasterize a partition of the selected print job.

17. The system of claim 14, wherein the partition manager is operable to set a partition size as a function of a time sensitive nature of the selected print job by determining if the selected print job has a production deadline, and as a result of determining that the selected print job has a production deadline:
identifying a print duration for the selected print job; and
identifying a rasterization duration such that the rasterization duration combined with the print duration falls within the production deadline.

18. The system of claim 14, wherein the partition manager is operable to setting a partition size as a function of an activity duration measured for the printing environment by setting a partition size according to an increasing function such that the partition size set increases as the measured activity duration increases.

19. The system of claim 18, wherein the partition manager is operable to set a partition size according to an increasing function by:
measuring a duration since the printing system has been idle;
setting the partition size at a minimum size when the measurement reveals that the printing system is presently idle;
setting the partition size to an intermediate size greater than the minimum size when the measurement reveals that the printing environment has been active for a duration that is less than a threshold duration; and
setting the partition size to a maximum size when the measurement reveals that the printing environment has been active for a duration that meets or exceeds the threshold.

20. The system of claim 19, wherein the partition manager is operable to set the partition size to an intermediate size by:
setting the partition size to a size that is greater than a first size that corresponds to a first duration that is less than the measured duration; and
setting the partition size to a size that is less than a second size that corresponds to a second duration that is greater than the measured duration.

21. A printing system for partitioning a number of print jobs, comprising:

a partition manager to set a partition size of each print job based on a length of time that has elapsed from a last known time when the printing system was idle;

an assignor operable to assign a different number of RIP engines to rasterize each sized job partition of each selected print job;

an aggregator operable to aggregate partitions of each selected print job rasterized by the RIP engines into an output file; and a print manager operable to communicate the output file to a printer;

in which setting a partition size of each print job based on a length of time that has elapsed from a last known time when the printing system was idle comprises setting a partition size according to an increasing function such that the partition size of each print job increases as the length of time that has elapsed from a last known time when the printing system was idle increases.

* * * * *